(12) United States Patent
Johansson et al.

(10) Patent No.: US 8,626,166 B2
(45) Date of Patent: Jan. 7, 2014

(54) COORDINATED NODE B RADIO RESOURCE MANAGEMENT MEASUREMENTS

(75) Inventors: Johan Johansson, Kungsangen (SE);
Martin Israelsson, Spanga (SE);
Mattias Wahlqvist, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1294 days.

(21) Appl. No.: 12/279,270

(22) PCT Filed: Feb. 12, 2007

(86) PCT No.: PCT/SE2007/050086
§ 371 (c)(1),
(2), (4) Date: Aug. 13, 2008

(87) PCT Pub. No.: WO2007/094734
PCT Pub. Date: Aug. 23, 2007

(65) Prior Publication Data
US 2009/0036092 A1    Feb. 5, 2009

(30) Foreign Application Priority Data

Feb. 15, 2006  (SE) ...................................... 0600340

(51) Int. Cl.
*H04W 36/00*    (2009.01)
(52) U.S. Cl.
USPC ..... 455/436; 455/420; 455/422.1; 455/435.2; 455/439; 455/525; 455/464; 455/438; 455/444; 455/405; 370/310.2; 370/328; 370/329; 370/331; 370/332; 370/347; 370/349
(58) Field of Classification Search
USPC ........... 455/405, 435.1–435.3, 450, 453, 436, 455/406, 452.2, 525, 501, 67.13, 410–411, 455/414.1, 420, 422.1, 448, 444, 452.1, 455/464, 509, 435.2, 439; 370/332, 328, 370/338, 232, 230, 320, 229, 230.1, 329, 370/347, 349, 310.2, 468; 709/203, 709/223–229, 217
See application file for complete search history.

(56) References Cited

U.S. PATENT DOCUMENTS 6,259,927 B1 * 7/2001 Butovitsch et al. ........... 455/522
8,009,608 B2 * 8/2011 Karaoguz et al. ............. 370/328
(Continued)

FOREIGN PATENT DOCUMENTS

EP    1418782 A1    5/2004
WO   2005/072073 A2    8/2005

OTHER PUBLICATIONS

International Search Report dated Jun. 14, 2007 (3 pages).

(Continued)

*Primary Examiner* — Vladimir Magloire
*Assistant Examiner* — Babar Sarwar
(74) *Attorney, Agent, or Firm* — Myers Bigel Sibley & Sajovec, P.A.

(57) ABSTRACT

The present invention relates to a subscription-based measurement concept where the detailed parameters for a certain measurement report are set by a measurement provider, i.e. a radio base station, instead of the measurement requester. For this purpose the measurement provider "publishes" a certain set of measurements that controller units for radio resource management (RRM) can subscribe to. According to the present invention parameters of measurements are defined in detail in the measuring entity, i.e. the target radio base station, as opposed to being defined by the requesting entity, i. e. the RRM controller.

16 Claims, 2 Drawing Sheets

(56) References Cited

U.S. PATENT DOCUMENTS

| | | |
|---|---|---|
| 2003/0210660 A1 | 11/2003 | Wiberg et al. |
| 2005/0002330 A1 | 1/2005 | Cave et al. |
| 2005/0228892 A1* | 10/2005 | Riley et al. .................. 709/228 |
| 2006/0182065 A1* | 8/2006 | Petrovic et al. ............... 370/332 |

OTHER PUBLICATIONS

Written Opinion dated Jun. 14, 2007 (4 pages).

Supplementary European Search Report, EP Application No. 07709479.5, Jul. 2, 2013, 5 pp.

* cited by examiner

COORDINATED NODE B RADIO RESOURCE MANAGEMENT MEASUREMENTS

FIELD OF THE INVENTION

The present invention relates to methods and arrangements in cellular mobile communication systems, in particular to methods and arrangements for coordinated radio base station measurements in radio networks with distributed architecture.

BACKGROUND OF THE INVENTION

In radio telecommunication systems it is important to have control of the radio environment. This is especially true for reuse-one systems, such as WCDMA or LTE (long term evolution) Radio Access Networks (RAN), as specified by 3rd Partnership Project (3GPP), where User Equipment (UE) sessions in a cell or in different cells are allowed to interfere radio-wise with each other on the same sets of frequencies. If the radio interference levels cannot be controlled in such systems, it is impossible to control parameters as, for instance, cell coverage, efficiency, or the possibility for a user equipment in a certain location to connect to and use the system.

The set of functions that is concerned with this problem area is generally referred to as Radio Resource Management (RRM). Examples of RRM functions include, e.g., Mobility Control, Power Control, Dynamic UE transmit-receive Scheduling, Load Sharing between cells (in networks that have multiple layers of cells), Cell-border interference mitigation, etc. Whereas some RRM functions have a single-cell scope, i.e. decisions that are taken by such an RRM-algorithm mainly impact only one cell and input data for such decisions results from this cell, other RRM functions have a multi-cell scope, which means that decisions taken by such an RRM-algorithm impact several cells and/or that the input data for such decisions comes from several cells. An example of such an RRM decision is the selection of the most suitable target cell at mobility and session setup, which may require load, capability and availability information for all possible target cells.

In Release 6 of the 3GPP-specifications for the WCDMA Radio Access Network (RAN), the controller for multi-cell RRM functions and some single cell RRM functions is the radio network controller (RNC) node. To provide an adequate input data to the RRM-functions in the radio network controller, a set of measurements has been defined that are to be measured in the user equipments and in the radio base stations and to be reported to the radio network controller based on the fact that and appropriate reporting criteria is fullfilled. The reporting could thus be triggered, e.g., when exceeding a certain threshold value (i.e. event-based) or could be performed periodically, etc.

The concept for measurements as specified in said Release 6 of the 3GPP-specifications for WCDMA RAN is flexible on the one hand, implies however, on the other hand, a considerable complexity. Hereby, the exact specification of a particular measurement is determined by the requesting entity, i.e. the radio network controller, and the detailed parameter settings for this measurement depends on the algorithm that uses the measurement and its parameter settings for operation and maintenance (O&M). For current measurement concepts in the 3GPP-specifications according to the state of the art, the details of the measurements are set by the measurement requester each time a new measurement is requested.

SUMMARY

The measurement concept for measurements in a radio base station as depicted above and specified in the existing release of the 3GPP-specifications for radio access networks works well for a centralized network architecture, such as specified in 3GPP WCDMA RAN Rel-6. However, due to the expected complexity this is expected to be more problematic for distributed open network architectures, as proposed for long term evolutions (LTE) of the 3GPP RAN, at least with regard to, e.g., resource consumption for measurements in a radio base station (such as a NodeB) or security issues.

The present invention therefore proposes a subscription-based measurement concept where the detailed parameters for a certain measurement are set by the measurement provider, i.e. the radio base station, instead of the measurement requester. For this purpose the measurement provider "publishes" a certain set of measurements that controller units for radio resource management (RRM) can subscribe to. According to the present invention parameters of measurements are defined in detail in the measuring entity, i.e. the target radio base station, as opposed to being defined by the requesting entity, i.e. the RRM controller.

It is thus a first advantage of the present invention that a reduction of the resource consumption for measurement handling both in the radio base stations and in the transport network and an increased security can be achieved.

It is another advantage of the present invention that it offers the advantage to prevent different requesting entities to set up lots of similar although different measurements. Instead, the proposed concept ensures that each of the RRM controller units uses a limited set of measurements and that multiple RRM controller units use the same measurement for similar tasks. It is thus and advantage that the proposed concept ensures that the resource consumption in a radio base station for measurements is kept low and is controllable by the radio base station itself.

It is still another advantage of the present invention that it enables transport network optimisations, such as multicast, to be used for the distribution of measurements.

Yet another advantage of the present invention is to make it more difficult to succeed with denial-of-service attacks. Thus, security is even further strengthened because a possible attacker would never interact directly with the measuring entity (i.e. the radio base station) but only with the multicast router.

Other objects, advantages and novel features of the invention will become apparent from the following detailed description of the invention when considered in conjunction with the accompanying drawings and claims.

DESCRIPTION OF THE INVENTION

Figure 1:
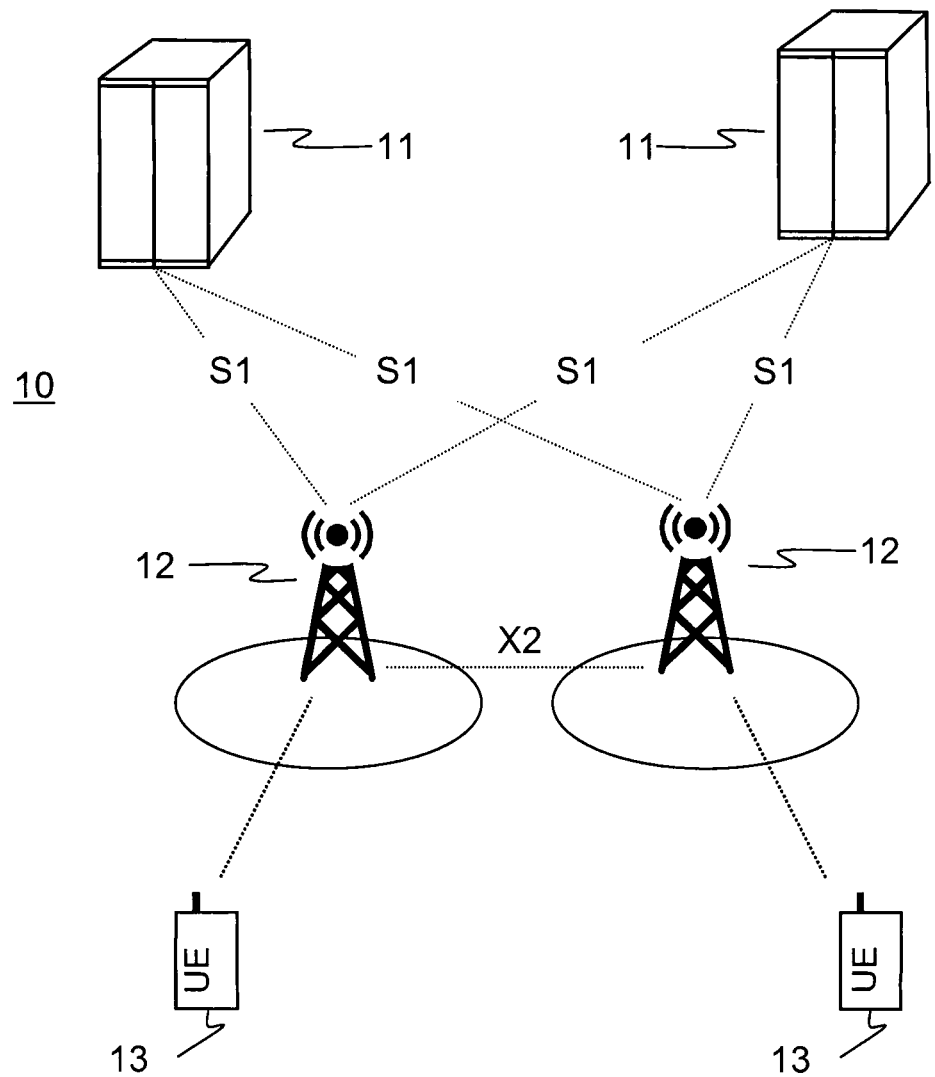
FIG. 1 illustrates schematically a distributed radio access network architecture within which the present invention can be applied.

FIG. 1 illustrates an evolved UMTS Radio Access Network (E-UTRAN) 10 consisting of a plurality E-UTRAN Node Bs (eNBs) 12, i.e. the radio base stations in an evolved UTRAN, providing the evolved UTRA U-plane and C-plane protocol terminations towards the user equipments (UE) 13. The eNBs 12 are interconnected with each other by means of the X2 interface. The eNBs 12 are also connected by means of the S1 interface to the Evolved Packet Core (EPC), here represented by mobility management entities (MME) 11. The S1 interface support a many-to-many relation between Access Gateways (aGW) and E-UTRAN Node Bs.

In a centralized network architecture, there is only one controller unit, normally the radio network controller, that requests measurements from a particular radio base station. In a distributed architecture as depicted in FIG. 1, however, there are several controllers 11 for RRM functions that need access to principally similar measurements from a particular radio base station 12. A typical scenario could be that an RRM server node and all neighboring radio base stations, or an RRM server node and a number of core-network gateway nodes, request all radio load related measurements. Thus, in the distributed architecture with a multitude of nodes—potentially even from different vendors or with different sets of parameters—the current measurement concept according to the state of the art implies the risk that all these distributed controllers will request different measurements possibly with different reporting criterias but nevertheless for principally the same kind of RRM decisions. As a consequence, each radio base station may have to provide a variety of measurements and report them differently towards each controller. This could make it necessary to assign undue high amounts of processing resources in the radio base station for handling this multitude of measurements. Further, an increased transport network load can be forseen due to said measurement reporting as each measurement is reported independently to each controller and assuming that the data sent in these messages is not completely similar such that it is not possible to use transport network optimizations such as, e.g., multicast.

Another aspect of the present invention concerns security. In an open distributed network architecture, where radio base stations 12 are attached to an IP network, and where radio base stations 12 are designed to provide measurement data to several controller units 11, the state of the art, as described for the 3GPP RAN Rel-6 measurement concept, allows for Denial-of-Service-Attacks, where an intruder could impersonate one or several RRM controllers and request measurements to the amount that the system gets overloaded, potentially resulting in dropped calls, refusal to set up new calls, node restarts, etc.

In the subscription-based measurement concept according to the present invention for a distributed radio access network used for radio base station measurements, the radio base station "publishes" the measurements that are available in this node, their detailed parameters, and how these measurements are reported. The RRM controllers, which can be located in other radio base stations or in different network-central nodes, may choose to subscribe to certain measurements provided by a certain radio base station. RRM algorithms in a RRM controller would need to adapt to the certain detail parameters of the measurements that are provided.

The implementation of the present invention includes a method for providing measurement reports and an arrangement for performing said method, the method including at least the parts described in the following:

1) An announcement part: In a truly distributed system, the announcement messages originate from the measurement provider units, i.e. the radio base stations. In simplified systems, announcement messages can instead also originate from a central network node, e.g. in an Operation & Maintenance (O&M) system.

In principal, announcement messages need to be sent on channels that both measurement report requesting units and providing units have agreed upon. From an RRM point of view the announcement message can contain information related to at least the aspects of accessing said measurement reports, the possible manners of the reporting, and the available content for said measurement reports. Access information includes, e.g., information about the channel where the reports are made available, addressing information, or requirements regarding the subscription mechanisms. Reporting can configured out of a variety of reporting mechanisms, e.g. by specifying regular or periodic measurements with certain time periods, event-based measurements in accordance with certain filtering criterions or reporting thresholds. The content of measurements reports can specify the available measurement parameters included into the reports and, optionally, certain filtering criterias to achieve, e.g., a selection of such parameters from a specific report. According to one conceivable alternative, measurement reports are announced by means of predefined identifiers that are commonly known to the report requester and report provider units. Finally, content information should also include information on the area for which a report is valid, e.g. a cell, a cell group, or one or more radio base stations.

According to a further embodiment of the present invention the announcement message can also support notifications when a new radio base station becomes available and notifications of new published and withdrawn/un-published measurements.

2) A subscription part: The method steps with regard to the subscription part allow for a RRM controller unit to subscribe and unsubscribe to wanted measurement reports. Subscription messages include information on one or several of the announced measurement reports that a controller unit intends to subscribe to. This can be done by explicitly referring to the content of such reports or, as explained above, by means of commonly agreed indentifiers. Further, if possible the subscription can define configuration details with regard to the reporting and/or potential filterings with regard to the reported measurement parameters in a subscribed report. By coordinating of the measurement reporting content, the present invention enables, as one conceivable example, the usage of multicast solutions, e.g. Multicast Subscription as defined by the Internet Engineering Task Force (IETF).

3) A reporting part: The reporting part includes the method steps to distribute to the RRM controller units the assembled measurement reports for a cell, a cell group, or a radio base station in accordance with the subscription requirements set forth in their subscription messages. The reporting is intended to operate between network nodes, i.e. a certain network protocol support needs to be included. By coordinating the measurement reporting content, the present invention can enable the usage of multicast solutions, e.g. multicasting as defined by the Internet Engineering Task Force (IETF), to be the transport solution to carry measurement reporting messages. This allows a reduction of the transport network resource consumption due to measurements.

Because the requesting entities are not allowed to set up measurements freely, but merely subscribe to pre-defined measurements, it becomes impossible to define particular Denial-of-service-measurements (e.g. very frequent measurements generating large amounts of data). Thus, the proposed concept makes it more difficult do successful denial-of-service attacks. Furthermore, when the proposed concept is used with multicast subscription and multicast measurement reporting, the security can be even further strengthened, as an attacker never would interact directly with the measuring entity (Node B), but only with the multicast router closes to the attacker. In this case, an attacker could not do Denial-of-service attacks affecting more than the network link between himself and the closest multicast router.

Figure 2:
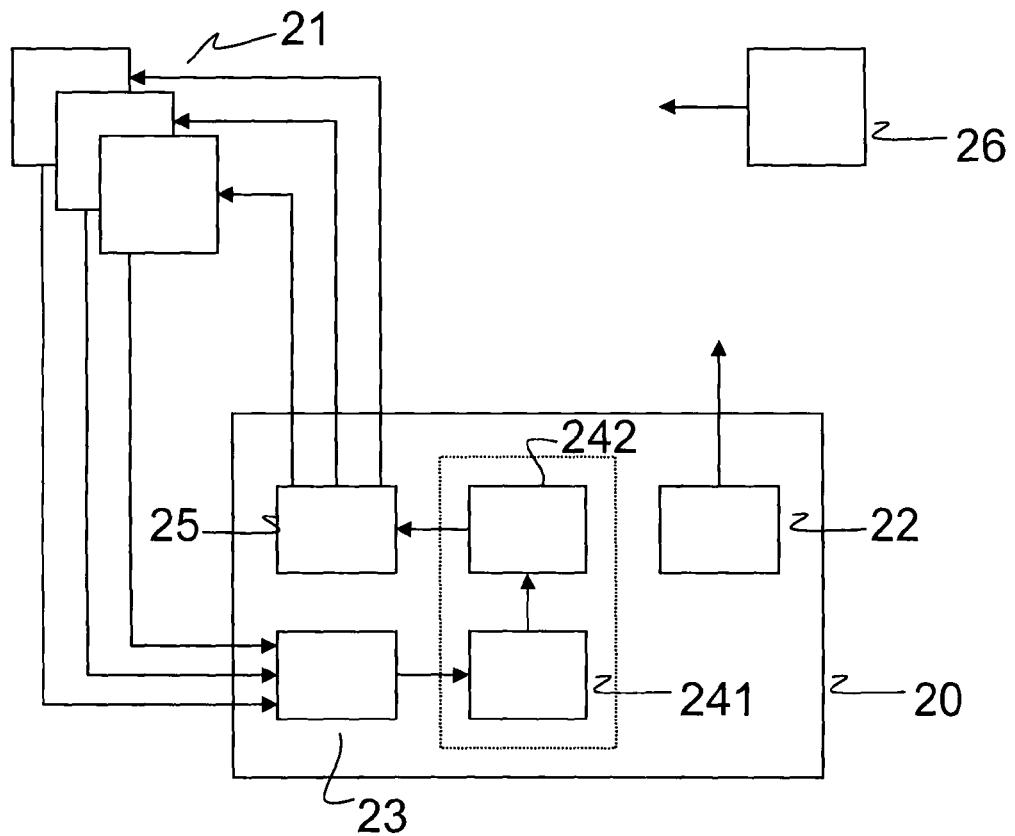
FIG. 2 illustrates a provider unit for measurement reports according to the present invention.
Figure 3:
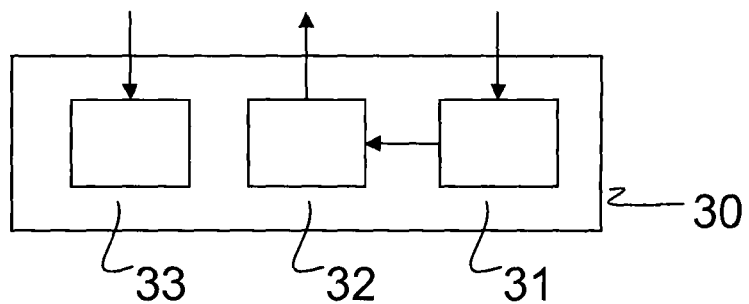
FIG. 3 illustrates a requester unit for measurement reports according to the present invention.

FIG. 2 illustrates a provider unit for measurement reports according to the present invention as described above. A means 22 for providing announcement messages for the measurement requester units 21 can be included either in the measurement provider unit 20 or in another controller unit 26. The announcement messages include one or more of an access-based information (i.e. how to access and subscribe to the reporting service), a reporting-based information (i.e. about details how the report is provided), and a content-based information for the available measurement reports. The provider unit includes a reception means 23 for receiving the subscription messages from measurement requester units 21 to subscribe to one or several of said measurement reports that have been announced. In response to these subscription messages the provider unit 20 comprises means 241 for processing said subscription messages and initiate the assembling in means 242 for required measurement reports to be transmitted to the corresponding measurement requester units 21. The assembled measurement reports are sent by help of transmitting means 25 to the subscribing measurement requester units at the instances specified for the measurement report. Correspondingly, the measurement requester units 21,30 comprise reception means 31 for receiving said announced available measurements reports including information about available reporting information and parameters, information about subscribing to said reports, and information for which area said information is available. A means 32 can be used to compose subscription messages to one or several measurement provider units to subscribe to one or several offered measurement reports according to the information in the announcement messages. Measurement reports at the instances specified in the subscription are received at the reception means 33.

Modifications to the embodiments of the invention described in the foregoing are possible without departing from the scope of the invention as defined by the accompanying claims. Numerals included within parentheses in the description and the accompanying claims are intended to assist the understanding of the claims and should not be construed in any way to limit the subject matter claimed by the claims.

The invention claimed is:

1. A method for providing measurement reports from a measurement provider unit to one or several measurement requester units in a telecommunication network, the method comprising:

publishing to said measurement requester units an announcement message containing information for a plurality of measurement reports that can be provided to said measurement requester units, wherein a respective one of the plurality of measurement reports includes radio resource management measurement parameters that can be provided from the measurement provider unit;

receiving at the measurement provider unit a subscription message from a subscribing measurement requester unit that has received the announcement message, wherein the subscription message identifies at least one of the plurality of measurement reports to which the subscribing measurement requester unit intends to subscribe and an instance at which the subscribing measurement requester unit wishes to receive the at least one of the plurality of measurement reports;

assembling at the measurement provider unit the at least one measurement report identified in the received subscription message; and transmitting the at least one assembled measurement report to the subscribing measurement requester unit at instances specified in the subscription message.

2. The method according to claim 1, wherein the announcement message is published by the measurement provider unit.

3. The method according to claim 1, wherein the announcement message is published by a central network node.

4. The method according to claim 1, wherein the announcement message contains information about a channel on which said measurement reports are transmitted and/or addressing information.

5. The method according to claim 1, wherein the announcement message contains information about a periodic reporting and/or an event-based reporting for the plurality of measurement reports.

6. The method according to claim 5, wherein the announcement message contains information about a reporting criterion for the plurality of measurement reports.

7. The method according to claim 1, wherein the announcement message contains information including one or more identifiers for the plurality of measurement reports.

8. The method according to claim 1, wherein the announcement message contains information including an indication of an area in which the plurality of measurement reports are valid.

9. The method according to claim 8, wherein said area includes one of a cell, a cell group, or a radio base station.

10. The method according to claim 1, wherein the received subscription message includes information about a measurement report type and/or a report criterion.

11. The method according to claim 1, wherein the measurement provider unit includes a radio base station in said telecommunication network and the measurement requester units include a radio resource management controller unit.

12. The method according to claim 11, wherein the radio resource management controller unit includes one of a neighbour base station or a core network gateway node.

13. The method according to claim 1, wherein the announcement message contains information regarding how to access a respective one of the plurality of measurement reports, how a respective one of the plurality of measurement reports is provided and/or the content of a respective one of the plurality of measurement reports.

14. A unit in a telecommunication network for providing measurement reports to one or several measurement requester units of said network, the unit comprising:

at least one transmitter configured to publish to said measurement requester units an announcement message containing information for a plurality of measurement reports that can be provided to said measurement requester units, wherein a respective one of the plurality of measurement reports includes radio resource management measurement parameters that can be provided from the unit;

a receiver configured to receive a subscription message from a subscribing measurement requester unit that has received the announcement message, wherein the subscription message identifies at least one of the plurality of measurement reports to which the subscribing measurement requester unit intends to subscribe and an instance at which the subscribing measurement requester unit wishes to receive the at least one of the plurality of measurement reports; and a processor configured to assemble the at least one measurement report identified in the received subscription message;

wherein the at least one transmitter is further configured to transmit the at least one assembled measurement report to the subscribing measurement requester unit at instances specified in the subscription message.

15. A method for requesting measurement reports from one or several measurement provider units in a telecommunication network using a measurement requester unit, the method comprising:

receiving a published announcement message containing information for measurements reports that can be provided to the measurement requester unit, wherein a respective one of the measurement reports includes radio resource management measurement parameters that can be provided from the one or several measurement provider units;

after receiving the published announcement message, transmitting a subscription message to the one or several measurement provider units, wherein the subscription message identifies at least one of the measurement reports to which the measurement requester unit intends to subscribe and an instance at which the measurement requester unit wishes to receive the at least one measurement report; and receiving the identified at least one measurement report at instances specified in the subscription message.

16. A measurement requester unit in a telecommunication network equipped for requesting measurement reports from one or several measurement provider units of said telecommunication network, the measurement requester unit comprising:

at least one receiver configured to receive a published announcement message containing information for measurements reports that can be provided to the measurement requester unit, wherein a respective one of the measurement reports includes radio resource management measurement parameters that can be provided from the one or several measurement provider units;

a transmitter configured to transmit a subscription message to the one or several measurement provider units, wherein the subscription message is based on the received published announcement message and identifies at least one of the measurement reports to which the measurement requester unit intends to subscribe and an instance at which the measurement requester unit wishes to receive the at least one measurement report; and the at least one receiver further configured to receive the identified at least one measurement report at instances specified in the subscription message.

\* \* \* \* \*